T. S. CHALMERS.
BABBITTING TOOL OR MOLD.
APPLICATION FILED APR. 5, 1915.
1,183,433.
Patented May 16, 1916.
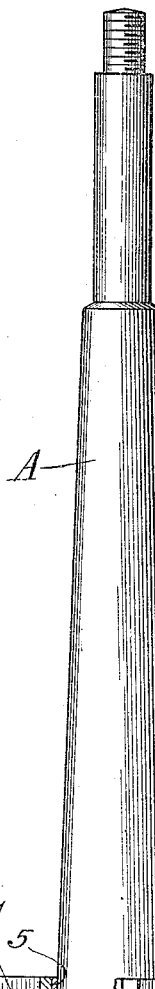
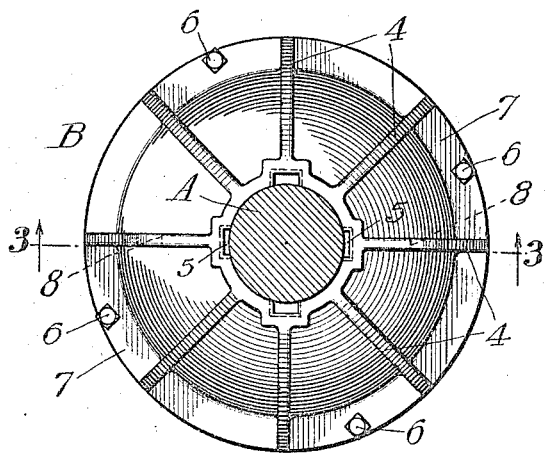
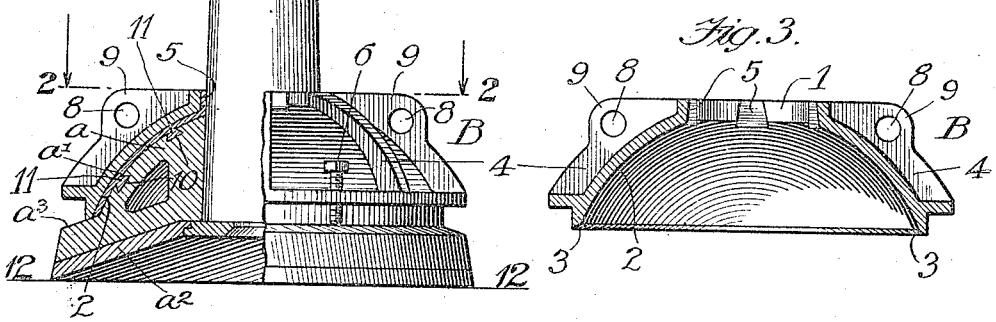
Witnesses
Martin H. Olsen.
S. A. Hawkins
Inventor
Thomas S. Chalmers.
By Ind. E. Waldo.
Atty.

UNITED STATES PATENT OFFICE.

THOMAS S. CHALMERS, OF CHICAGO HEIGHTS, ILLINOIS, ASSIGNOR TO CHALMERS & WILLIAMS, INC., OF CHICAGO HEIGHTS, ILLINOIS, A CORPORATION OF ILLINOIS.

BABBITTING TOOL OR MOLD.

1,183,433.

Specification of Letters Patent.

Patented May 16, 1916.

Application filed April 5, 1915. Serial No. 19,341.

*To all whom it may concern:*

Be it known that I, THOMAS S. CHALMERS, a citizen of the United States, and a resident of Chicago Heights, in the county of Cook and State of Illinois, have invented a new and useful Babbitting Tool or Mold, of which the following is a specification.

This invention relates to a tool or mold for use in babbitting the ball bearings between the heads formed on the inner and outer shafts of disk crushers of the general type shown and described in United States Letters Patent No. 1,072,193, dated September 2, 1913, and known to the trade as Symons disk crushers.

Prior to my invention, Babbitt linings for the ball bearings between the outer and inner shafts of crushers of the type specified have been cast directly between the opposed surfaces of the ball bearing members of said upper and inner shafts, respectively, the surfaces of one thereof being finished to form a segment of a sphere and the other being provided with recesses into which the cast Babbitt metal will flow, thus forming interlocking projections which will securely connect said Babbitt linings thereto. In practice, the bearing sockets in the outer shafts have usually been thus finished, and the Babbitt linings have been cast upon and secured to the balls of said ball bearings. To thus babbitt ball bearings of a disk crusher of this type, it is necessary to support the outer shaft in upright position with the end thereof, in which the bearing socket is formed, disposed upwardly. The inner shaft is then inserted into the bore of the outer shaft and is positioned therein so that the members of the ball bearings thereon will be practically concentric and a Babbitt lining of substantially uniform thickness produced. Shims are then placed between the opposed surfaces of said bearing members to provide a space equal in width to the desired thickness of the Babbitt lining. The space at the outer edges of the bearing members is then closed by means of a dam of clay or other plastic material to prevent the molten Babbitt metal from running out between said bearing members. The molten Babbitt metal is then poured into the cavity thus formed between the opposed faces of the bearing members through holes cored through the ball member on the inner shaft, which as stated, is disposed upwardly. In large size disk crushers of this type, the shafts are approximately 11 feet long and weigh approximately 2¾ tons and, owing to this great length and weight, the operation of babbitting the ball bearings thereof involves a great deal of time, labor and expense. This is particularly true where it becomes necessary to rebabbitt said ball bearings after they have become worn in use, for the reason that, in practically all cases, no facilities are at hand for doing the work, which involves removing both the outer and the inner shafts of the crusher, shoring the outer shaft in upright position with the bearing socket disposed upwardly and with the inner shaft inside thereof and spaced therefrom by means of a suitable spacing sleeve or ring as heretofore described. Also, in casting the Babbitt lining, it will be necessary to provide for hoisting the ladle containing the molten Babbitt metal above the upper end of the inner shaft, thus involving further expenditure of time and labor. In addition to the expense in time and labor involved in thus babbitting and rebabbitting the ball bearings of disk crushers of this type, said operation involves a further and principal item of expense represented by the loss of time due to shutting down the machine, which in the case of larger machines is usually from two to three days.

The object of the present invention is to provide simple, convenient and inexpensive means designed and adapted to coöperate with the inner shaft and ball member of the ball bearing formed thereon for applying a layer of babbitt to the bearing surface of said member, which means shall be entirely separate and distinct from said ball bearing member.

To this end my invention comprises a mold provided with a central opening which is adapted to fit over the inner shaft closely adjacent to the ball bearing member formed thereon and, in its under side, with a socket of the same size and shape as the ball bearing socket formed in the outer shaft of the crusher. In connection with said mold I also provide means designed to coöperate with rigid parts of the ball bearing member on said inner shaft for supporting said mold in desired spaced relation to the surface of said member. As shown, said means consists of screws threaded through a flange formed on and which projects outwardly from the body of the mold, the lower ends of which are adapted to rest on a corresponding flange on the ball bearing member outside of the ball proper. The space between the mold and the ball bearing member at the edge of the ball bearing member is closed by means of a dam of clay or other plastic material, and the mold is provided with suitable pour holes, consisting, as shown, of grooves formed in the sides of the shaft bearing in said mold.

The invention also comprises the various other features and details of construction hereinafter described and claimed.

In the accompanying drawing, in which my invention is fully illustrated, Figure 1 is a side view, partly in section of my improved babbitting mold shown, as applied in use, for babbitting the ball bearing member of the inner shaft of a disk crusher of the type to which my invention relates. Fig. 2 is a sectional plan view thereof on the line 2—2 of Fig. 1; and Fig. 3 is a sectional view of the mold, separate from the shaft, on the line 3—3 of Fig. 2.

Referring now to the drawing, in which I have shown my improved babbitting tool or mold as applied in actual use for babbitting the ball member of the ball bearing formed on the inner shaft of a disk crusher of the type referred to, A designates said shaft, $a$ the ball bearing member formed thereon, which for convenient reference may be designated the ball, $a'$ the Babbitt lining secured to the bearing face thereof, $a^2$ the crusher disk secured to the face of the head formed by said ball $a$, and $a^3$ a disk-supporting flange formed on the ball $a$ and which projects outwardly therefrom.

All of the foregoing parts and elements are clearly shown and fully described in United States Letters Patent No. 1,072,193, dated September 2, 1913, to which reference is made for a detailed description thereof.

In accordance with my invention, the means for applying the Babbitt lining $a'$ to the bearing surface of the ball $a$ consists of a tool or mold, designated, as a whole, B. Said mold is provided with a central hole or opening 1, adapted to receive the shaft A and substantially equal in diameter to the diameter of said shaft adjacent to the ball $a$, the relation being such that the mold B may be adjusted to and removed from the shaft A without binding, and will support said mold substantially concentric with the ball $a$.

Formed in the under surface of the mold B, which is opposed to the surface of the ball $a$, when said mold is adjusted to the shaft A, is a spherical socket 2 which conforms in size and shape to the socket bearing member on the outer crusher shaft, not shown.

The socket 2 of the mold is larger than the ball $a$, the relation being such that when said mold is adjusted to the shaft A with its lower edge resting on the face of the flange $a^3$ outside of said ball $a$, a space will be formed between the opposed faces of the ball $a$ and of the socket 2 equal to the desired thickness of the Babbitt lining $a'$, a usual thickness being about ⅜ of an inch. As shown, the lower edge of said mold is beveled as shown at 3 to correspond to the inclination of the face of the flange $a^3$ against which it rests in use.

The mold B is made of metal, preferably cast iron, and is preferably reinforced and strengthened by ribs 4 formed on the outer surface thereof, thus materially reducing the weight of said mold. Said mold B is also provided with suitable pour holes consisting as shown, of grooves 5 formed in the sides of the shaft hole or opening 1.

To provide for stripping the mold B from the Babbitt lining $a'$ after said lining has been cast, screws 6 are threaded through rigid parts of or projections on said mold B, as shown through a flange 7 formed on said mold at a relatively short distance above its lower edge, say approximately 1½ inches. The lower ends of said screws 6 are adapted to bear on the flange $a^3$. With the described construction it is obvious that by turning said screws, said mold may be raised out of contact with the lining $a'$.

For use on larger machines, the molds B will be of considerable size, in some cases being as large as 2 feet 9 inches in diameter, and, being made of metal, will be too heavy to handle by hand. Provision is accordingly made for attaching the chains or cables of a suitable hoist thereto. As shown, said means consists of eyes 8 formed in lugs or projections 9 on diametrically opposed ribs 4 of said mold.

To provide for securing the lining $a'$ to the ball $a$ under-cut holes or recesses 10 are formed in the surface of said ball into which the molten Babbitt metal will flow thus, when said Babbitt metal hardens, forming projections 11 on said lining which will interlock with the holes or recesses 10 formed in the surface of said ball $a$.

With my improved babbitting tool or mold, the operation of babbitting the ball $a$ is as follows:—The shaft A is removed from the crusher and the mold B is adjusted thereto. Said shaft is then up-ended so as to rest on the face formed by the disk $a^2$, on a suitable support, as a floor the line of which is indicated at 12, in which position the lower edge of the mold will rest in contact with the disk supporting flange $a^3$. If desired or necessary, the joint between said mold and flange $a^3$ may be packed with clay or other plastic substance. The molten Babbitt metal is then poured into the mold through the pour holes 5 and is permitted to stand until said Babbitt metal cools and hardens. Said mold is then stripped from said lining, which can be conveniently done by turning the screws 6 when in contact with the flange $a^3$, thus raising said mold clear of said lining. This completes the babbitting operation. The shaft A is then turned into horizontal position, the mold B removed therefrom and said shaft again inserted into the machine, when the machine is again ready for use.

By the use of my improved babbitting mold the time and labor required for the babbitting and rebabbitting the ball bearing members of disk crushers of this type is reduced approximately three quarters, thus effecting a great saving in the cost of the babbitting operation and also effecting a large saving due to the comparatively short time that it will be necessary to shut the crusher down.

By "Babbitt metal" as used herein, I mean to include any usual or desired form of anti-friction metal, such as is commonly used for lining journal and other bearings.

I claim:—

1. A mold for lining the bearing ball of the inner shaft of a disk crusher of the type described, said mold being provided with a hole or opening adapted to receive said shaft and to centralize said mold with the bearing ball on said shaft when said mold is adjusted to said shaft, said mold being also provided with a spherical socket in its under side concentric with said shaft opening, the lower edge of said mold being adapted to rest in contact with a rigid surface on said bearing ball when said mold is adjusted to said shaft, the socket in said mold being sufficiently larger than the bearing ball to form a space between the opposed surfaces thereof equal in width to the desired thickness of the lining to be applied to said bearing ball, substantially as described.

2. A mold for lining the bearing ball of the inner shaft of a disk crusher of the type described, said mold being provided with a hole or opening adapted to receive said shaft and to centralize said mold with the bearing ball on said shaft when said mold is adjusted to said shaft, said mold being also provided with a spherical socket in its under side concentric with said shaft opening, the lower edge of said mold being adapted to rest in contact with a rigid surface on said bearing ball when said mold is adjusted to said shaft, the socket in said mold being sufficiently larger than the bearing ball to form a space between the opposed surfaces thereof equal in width to the desired thickness of the lining to be applied to said bearing ball, and means for stripping said mold from said ball and lining after casting said lining, substantially as described.

3. A mold for lining the bearing ball of the inner shaft of a disk crusher of the type described, said mold being provided with a hole or opening adapted to receive said shaft and to centralize said mold with the bearing ball on said shaft when said mold is adjusted to said shaft, said mold being also provided with a spherical socket in its under side concentric with said shaft opening, the lower edge of said mold being adapted to rest in contact with a rigid surface on said bearing ball when said mold is adjusted to said shaft, the socket in said mold being sufficiently larger than the bearing ball to form a space between the opposed surfaces thereof equal in width to the desired thickness of the lining to be applied to said bearing ball, and means for stripping said mold from said ball and lining after casting, consisting of screws threaded through rigid parts of said mold the lower ends of which are adapted to bear on rigid parts of said ball, substantially as described.

4. A mold for lining the bearing ball of the inner shaft of a disk crusher of the type described, said mold being provided with a hole or opening adapted to receive said shaft and to centralize said mold with the bearing ball on said shaft when said mold is adjusted to said shaft, said mold being also provided with a spherical socket in its under side concentric with said shaft opening, the lower edge of said mold being adapted to rest in contact with a rigid surface on said bearing ball when said mold is adjusted to said shaft, the socket in said mold being sufficiently larger than the bearing ball to form a space between the opposed surfaces thereof equal in width to the desired thickness of the lining to be applied to said bearing ball, a flange on said mold and screws threaded through said flange the lower ends of which are adapted to bear on rigid parts of said bearing ball for stripping said mold from said ball and lining after casting, substantially as described.

In testimony that I claim the foregoing as my invention, I affix my signature in the presence of two subscribing witnesses this 20th day of March, 1915.

THOMAS S. CHALMERS.

Witnesses:
W. M. Doudy,
M. B. Easton.